Patented Sept. 25, 1923.

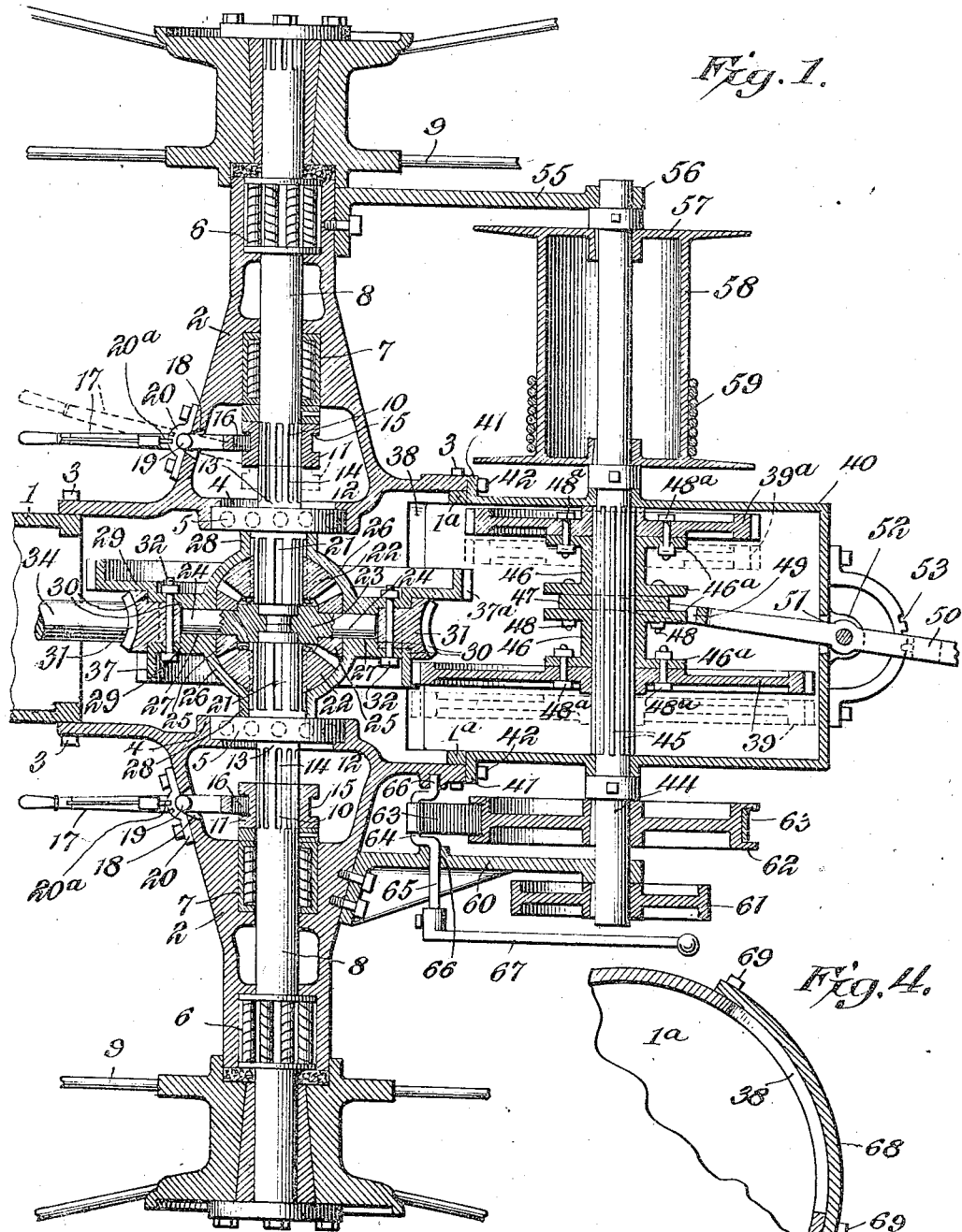

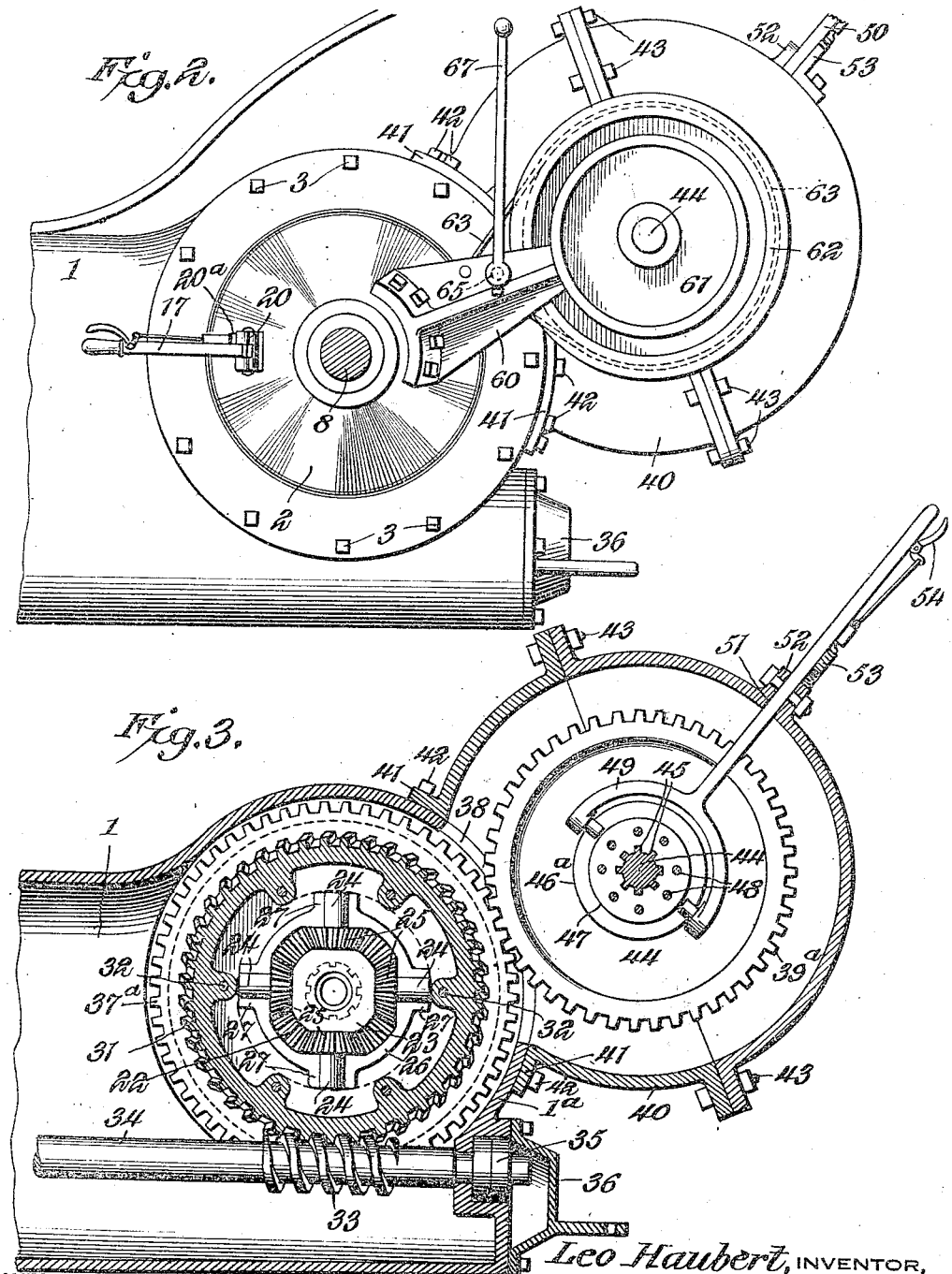

1,469,002

UNITED STATES PATENT OFFICE.

LEO HAUBERT, OF MUSKOGEE, OKLAHOMA, ASSIGNOR OF ONE-THIRD TO JOHN CHARLES BENNETT AND ONE-THIRD TO JOHN A. WOLFE, BOTH OF TULSA, OKLAHOMA.

POWER-DELIVERING ATTACHMENT FOR AUTOMOBILE TRUCKS OR TRACTORS.

Continuation of application Serial No. 576,309, filed July 20, 1922. This application filed February 10, 1923. Serial No. 618,342.

*To all whom it may concern:*

Be it known that I, LEO HAUBERT, a citizen of the United States, residing at Muskogee, in the county of Muskogee and State of Oklahoma, have invented new and useful Improvements in Power-Delivering Attachments for Automobile Trucks or Tractors, of which the following is a specification.

This invention relates to power delivering attachments for automobile trucks or tractors, and the present application is a continuation of the allowed application, Serial No. 576,309, filed by me on July 20, 1922.

The object is to provide mechanism which may be readily incorporated in the structure of trucks, tractors or similar machines for the purpose of delivering the power generated by the tractor engine and utilizing the same for other purposes while the tractor is standing still and not engaged in pulling operations.

Another object is to provide such means for the purposes specified, which may be applied or attached to the tractor with a minimum amount of change in the latter, and which may be readily detached from the tractor if desired, the additional mechanism, however, being so designed as to remain on the tractor if preferred and not to interfere with the operation of the same while engaged in pulling.

A further object is to provide an attachment for tractors whereby the power from the engine thereof may be directed to the traction wheels for the ordinary use of the same, or may, at the will of the operator, be disconnected therefrom to allow the tractor to stand still, and the said power directed to the improved mechanism, located out of the way of the operator, for the purpose of hoisting, hauling or driving belts, etc., the controlling means for the mechanism being within easy reach of the operator or driver, so that such changing or shifting may be effected instantly.

A further object is to provide means for controlling the mechanism when being used for hoisting loads so that the said mechanism may be disconnected from the engine power and the said load be lowered as desired by brake mechanism included in the attachment.

A still further object is to incorporate, in the present application, improved features in the power transmitting gearing between the differential gearing in the rear axle of the truck or tractor and the winding drum shaft, to constitute means whereby the said drum may be driven in either direction at different rates of speed to wind up a rope or cable, such rate being optional with the operator and permitting the cable to unwind from the drum under the control of said operator, when it is desired to lower the load or to pay out the cable.

A full and complete understanding of the invention may be obtained from a consideration of the following detailed description taken in connection with the accompanying drawings forming a part of this specification; it being understood that while the drawings show a practical form of the invention, the latter is not confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:

Fig. 1 is a horizontal sectional view through the rear axle structure of an ordinary tractor and showing the improvements attached thereto.

Fig. 2 is a side elevation of the rear end of the tractor, showing the location of the attachment, the rear tractor wheels being omitted.

Fig. 3 is a vertical section through the mechanism, taken longitudinally of the tractor.

Fig. 4 is a detail sectional view showing the manner of closing the opening in the rear portion of the differential housing when the attachment is removed.

In oil fields and other similar places where tractors are in general use for the purpose of pulling or hauling loads or for the cultivation of the ground on a large scale, a great demand has been created for means to be used in connection with the tractor whereby the power from the engine may be utilized for hoisting purposes, as, for instance, the raising or lowering of rods, tubing or casing into or out of oil wells and for other similar purposes. Such means must necessarily be small and compact and so located or applied to the tractor as not to interfere with the freedom of operation of the latter in its common use, and must be readily handled or controlled by the driver while sitting in his usual seat or capable of control from the ground.

The improvements disclosed herein are designed to fulfill this demand, and are so constructed as to require only a small amount of change in the structure of the tractor in order to apply the same in position, and the same may be readily removed from the tractor and the latter left in its normal condition when desired.

While the drawing shows the improvements applied to a tractor of a well known form, the invention may be used in connection with an automobile or truck with equal advantage as will become apparent.

Referring to the drawings, 1 indicates the rear portion of the transmission housing which is in the form of a tubular casing terminating in a circular ring, the axis of which is at right angles to the axis of the part 1, the latter constituting the trunk or back of the tractor. Secured to the opposed edges of the circular ring are conical or tapering rear axle housings 2 having integral flanges which are secured to the said ring by bolts 3. The axle housings are provided at their inner, enlarged ends with circular seats 4 into which are adapted to be placed ball-bearing rings 5, the outer ends of the housings being similarly provided with seats for the reception of roller-bearing cages 6 and the intermediate portions of the said housings being provided with similar roller bearings 7, all of which may be of the usual form of construction.

Mounted in the roller bearings 6 and 7, at each side of the machine are separate axles 8 to the outer, exposed ends of each of which are secured, in the usual manner, traction wheels 9 which may be of any desired form, the said axles being free to rotate independently of each other. The inner ends of the axles or spindles 8 extend inwardly beyond the roller bearings 7, and are provided with longitudinally disposed series of slots or grooves 10 to provide teeth for engagement with corresponding teeth provided in slidable clutch rings 11 located in the cavities 12 provided in the inner, enlarged ends of the tapering housings 2.

Mounted and supported within the ball-bearing rings 5 are short shafts or axles 13, having their outer ends in abutting relation to the inner ends of the separate axles 8 and their inner ends abutting against each other, at the longitudinal center line of the tractor, the said outer ends being provided with longitudinal grooves 14 matching the grooves 10 and adapted to receive the slidable ring 11, when the latter is shifted, and to be locked thereby to the axles 8, said ring being moved so that both ends of the shafts or axles will be covered thereby and caused to rotate in unison.

The slidable rings are each provided with an annular channel 15 for the reception of a yoke 16 provided at the inner ends of operating levers 17 extending forwardly through openings 18 provided in the front walls of the tapering housings 2, the said levers being provided with vertically disposed pivot pins 19 suitably mounted in bearings 20 to permit the levers to be swung inwardly and outwardly for causing the engagement or disengagement of the rings 11 with the adjacent ends of the abutting axles 8 and 13, respectively. Suitable spring-pressed detents $20^a$, adapted to engage corresponding notches in the bearings 20, are employed to hold the levers 17 in either adjusted position. While the levers are shown as extending forwardly, the same may extend in any other radial direction, but this position locates them in a convenient place to be operated by the driver, and it will be seen that they may be extended or otherwise connected to be located elsewhere, if desired.

The inner ends of the short axles or shafts 13 are provided with grooves 21 which receive corresponding teeth formed in spaced, opposed differential gears 22, of the beveled type, which lock the same thereon and cause the said gears with their respective axles to turn together at all times in either direction.

Mounted on the inner reduced ends of the short axles 13, which abut against each other, is a spider ring 23 which is free to rotate thereon, and the said ring is provided with a plurality of outstanding stud shafts 24 upon each of which is loosely mounted a beveled, differential pinion 25 meshing on either side with the teeth of the gears 22, and adapted to act therewith in the manner of the well known differential gearing of machines of this class, in order to allow one tractor wheel to turn independently of the other for turning corners, etc.

The differential gears and pinions are housed within the two housing members 26 which are hollow and semi-spherical in shape, the two halves being provided with coacting bearing sockets 27 which are adapted to fit together and receive the outer ends of the pinion shafts 24, and are provided at their outer ends with cylindrical collars or bearings 28 for the reception of the intermediate portions of the short axles 13 and abutting against the inner faces of the ball bearing rings 5.

The housing members 26 are further provided with integral, circular plates or discs 29 in spaced relation to each other, and provided with annular offsets 30 to constitute circumferential shoulders for receiving a worm gear ring 31 and properly position the same therebetween the housing members and the worm gear being held together by means of a series of bolts 32.

The worm gear 31 is engaged on its lower side by a worm 33 mounted on the extension of the engine shaft 34, the rear end of said extension being suitably mounted in an anti-friction bearing 35 located at the rear end of the casing and adapted to be covered by a draw bar cap 36 having means for connection with the implement or load to be drawn by the tractor when the same is in such use.

One of the discs 29 is provided with an annular, outstanding, peripheral flange having external gear teeth extending entirely around the same and constituting a gear wheel 37 of lesser diameter than the diameter of the worm wheel 31. The opposite disc 29 is extended beyond the periphery of the worm wheel 31 and is provided with an annular flange having teeth and constituting a gear wheel 37ª of greater diameter than the worm wheel and the relative diameters of these wheels may vary.

The circular, enclosing portion 1ª of the housing 1, which encircles the major portion of the gears described, is provided in its upper, rear portion with a rectangular opening 38 through which is permitted the meshing of spaced gears 39 and 39ª with the gears 37 and 37ª, the said gears 39 and 39ª being carried in a housing 40 composed of two equal halves, the lower member of which is provided with attaching flanges 41 adapted to receive bolts 42 for securing the housing 40 in position over the opening 38, the angle between the centers of the two housings being substantially at fifteen degrees, with respect to a horizontal line.

The gear 39 is of considerably greater diameter than the gear 39ª, and is adapted to engage with the teeth of the relatively small gear 37 carried by the differential gearing when the same is shifted longitudinally of its axis, while the said gear 39ª is of a diameter to mesh with the teeth of the gear 37ª when such longitudinal shifting movement is imparted simultaneously to the gears 39 and 39ª, in a manner to be described.

The housing 40, which has its two members secured together by flange and bolt construction 43, may readily have its outer or upper member removed for exposing the interior of the housing and to afford access to the mechanism contained therein. The outer faces of the two members comprising the housing 40 are provided with coacting bearings for the reception of the shaft 44, which is provided with a series of longitudinally disposed teeth 45 extending between the inner faces of the side walls of the housing 40 and adapted to intermesh with teeth carried by the gears 39 and 39ª which are spaced apart by spacing sleeves 46 having end flanges 46ª between the inner pair of which is clamped a disc 47 of less diameter than the adjacent flanges 46ª, the several members being held together by a series of bolts 48. The sleeves 46 and disc 47 are provided with alined openings for engagement with the teeth 45 of the shaft 44 so that they may be moved longitudinally along the same and cause the latter to be rotated at all times when one of the gears 39 and 39ª is actuated.

The groove provided by the disc 47 is adapted to be engaged by a shifting yoke 49 formed on the lower or inner end of a lever 50 extending upwardly and rearwardly through a suitable opening 51 provided in the cover member of the housing and pivoted between ears 52 for a swinging movement transversely of the longitudinal axis of the tractor to slide the gear 39 or 39ª into or out of engagement with the gears 37 or 37ª. The operating lever 50 may be moved in either direction to disengage the gears, and coacts with a toothed sector 53 located below the lever and adapted to be engaged by a spring-pressed pawl operated by an ordinary latch lever 54 so that the said lever may be locked either to the right or the left.

The width of the housing 40 is sufficient to permit of three positions of the gears, as will be seen by reference to Fig. 1 of the drawings, that is, one position when the large gear 39 is in mesh, as shown in full lines; another intermediate position when both gears are in neutral or out of gear, as indicated in dotted lines; and a third position as when the smaller gear 39ª is in mesh, not shown. It will be seen that when the gears 37ª and 39ª are in engagement, a greater rate of speed will be imparted to the winding shaft 44 than when the gears 37 and 39 are in mesh, and that the number of speeds supplied through the medium of the transmission gearing of the tractor (not shown) will be doubled in the winding shaft, in either direction.

Adjacent to the righthand tractor wheel 9 a rearwardly directed bracket 55 is bolted or otherwise secured to the reduced extended portion of the adjacent axle housing, the said bracket extending upwardly at an angle of substantially fifteen degrees, and is provided with a terminal bearing 56 to receive the end of the shaft 44 which is extended to that point, the intermediate portion of said shaft between the bracket and the side of housing 40 having keyed thereto a winding drum 57 having a winding surface 58 for the reception of a cable 59 for use in any desired manner.

The opposite end of the shaft is extended and has a bearing in a similar bracket 60 bolted to the tapering portion of the axle housing and a belt pulley 61 is keyed on the end of the shaft beyond the bracket 60 for the purpose of driving a belt for any desired purpose.

Between the bracket 60 and the adjacent side wall of the housing 40, a flanged brake wheel 61 is keyed or otherwise secured to the shaft 44, and a brake band 63 is fitted between the flanges of said wheel and has one end suitably secured to a convenient part of the housing while the other end of said band is secured to a crank 64 of an actuating shaft 65 having suitable bearings 66 formed in the flange of the axle housing 2 and the bracket 60, respectively, said shaft 65 being parallel with the rear axles and having an operating lever 67 secured to the extended end thereof for the purpose of applying the brake band when it is desired to control the retrograde movement of the shaft 44 when the gear wheels 39 and 39ª are out of engagement with the gear wheels 37 and 37ª, respectively.

When it is desired to use the tractor as a hoisting device, it is only necessary to swing and lock the levers 17 in the position shown in Fig. 1 of the drawings, when the toothed collars 11 are removed from engagement with the short axles 13 and the main axles 8 are idle and the tractor wheels 9 stationary. Assuming that the rear lever 50 is moved into the position shown with the gears 39 meshing with the gears 37, the engine clutch (not shown) may then be shifted to impart motion to the shaft extension 34 when power will be imparted through the worm 31 and associated parts, through the wheel 37 and 39 to the shaft 44 when the drum will be revolved in the desired manner, and at a relatively slow rate of speed. When a greater speed is desired, the wheels 37ª and 39ª are first shifted into mesh. When the load is lifted to the desired elevation and it is desired to lower the same, the power may be cut off at the engine clutch, and the lever 50 swung to engage the latch or pawl with the central notch of the sector 53 which moves the wheels 39 and 39ª to the neutral position, and by bearing on the brake lever 67, the unwinding movement of the drum may be easily controlled.

By removing the brackets 55 and 60 together with the members comprising the housing 40 and the parts carried thereby, the entire hoisting attachment may be removed from the tractor, the levers 17 remaining in position and the opening 38 being covered by a curved plate 68 held in position by bolts 69, as shown in Fig. 4.

From the foregoing, it will be seen that a simple attachment for tractors, trucks, automobiles or the like has been provided which may be installed in position without materially altering the structure of the tractor, and that simple and effective controlling means within easy reach of the driver or operator has been provided by means of which the machine may be driven at different speeds as a tractor or as a hoisting machine, or both at the same time, as the clutch rings 11 may be left in connected position with the short axles 13 and the machine made to move forwardly or rearwardly at the same time the winding drums are actuated.

What is claimed is:—

1. A power delivering attachment for motor vehicles having separate drive axles, differential gearing located between the axles, a drive shaft connected to the gearing, short shafts extending from the differential gearing, in alinement with the separate drive axles, anti-friction bearings for the short shafts at an intermediate point of the length thereof, means for connecting the short shafts with the axles or disconnecting the same therefrom, a winding drum, and gearing connecting the winding drum with the differential gearing.

2. A power delivering attachment for motor vehicles having separate drive axles, differential gearing between the axles, a drive shaft connected to the gearing, short shafts extending from the differential gearing having their outer ends in alinement with the inner ends of the axles and their inner ends arranged within the differential gearing and keyed thereto, means for connecting the short shafts with the axles or disconnecting the same therefrom, a plurality of grooves on the short shafts and on the inner ends of the axles, collars slidable longitudinally of the axles and the shafts and having coacting teeth to match the grooves for connecting the axles to the shafts, mechanism for shifting the collars along the axles and shafts, spaced gear wheels carried by the differential housing, a winding drum, means for mounting the same, and gearing connecting the winding drum with the said gear wheels.

3. A power delivering attachment for motor vehicles having separate drive axles, differential gearing between the axles, a drive shaft connected to the gearing, means connecting the differential gearing to the axles or disconnecting the same therefrom, spaced gear wheels carried by the differential housing, a drum shaft, a winding drum mounted on the shaft, spaced gear wheels splined on the drum shaft and adapted to alternately mesh with the gear wheels carried by the differential housing, and means for longitudinally moving the gear wheels on the drum shaft to make or break said engagement.

4. A power delivering attachment for motor vehicles having separate drive axles, anti-friction bearings for said drive axles, differential gearing between the axles, a drive shaft connected to the gearing, short shafts extending from the differential gearing to said axles, an anti-friction bearing for the intermediate portion of each of said short shafts, a plurality of longitudinal grooves provided on the opposite ends of the short shafts, similar grooves provided on the inner ends of the axles, movable collars having a plurality of teeth to match the grooves, means for shifting the collars along the axles and the shafts, a winding drum, and gearing connecting the winding drum with the differential gearing.

5. A power delivering attachment for motor vehicles having separate drive axles, differential gearing between the axles, a drive shaft connected to the gearing, short shafts extending from the differential gearing and in line with the separate drive axles, means for connecting the short shafts with the axles or disconnecting the same, spaced gear wheels carried by the differential housing, a transverse drum shaft supported in spaced relation to the axles, longitudinally shiftable, spaced gear wheels splined on the drum shaft and adapted to mesh through said opening with the gear wheels carried by the differential housing, means for longitudinally moving the gear wheels on the drum shaft to make or break said engagement, and a winding drum keyed to the drum shaft.

6. A power delivering attachment for automobile trucks or tractors having drive axles, differential gearing interposed between said axles, a drive shaft connected to the differential gearing, short, separate shafts keyed to and rotated by the differential gearing, the outer ends of said shafts alining with the inner ends of the drive axles, and each having a plurality of alined grooves, collars slidable longitudinally of the axles and shafts and having coacting teeth to match the grooves for connecting the axles to the shafts, pivotally mounted levers connected to the collars to slide the same into or out of engagement, spaced gear wheels carried by the differential housing, a drum shaft mounted in spacing relation to the axles, spaced gears slidably mounted on the drum shaft and in position to be alternately engaged with or disengaged from the gears on the differential housing, means for shifting the slidable gears and locking them in adjustment, a housing covering the said gears and supporting the shifting means, and a winding drum mounted on said shaft.

7. A power delivering attachment for motor vehicles having separate drive axles, differential gearing between the axles, a drive shaft connected to said gearing, means for connecting the differential gearing to the axles or disconnecting the same therefrom, spaced gear wheels carried by the differential housing, one of said gear wheels being larger than the other, a transverse drum shaft supported in spaced relation to the drive axles, longitudinally-shiftable, spaced gear wheels of different diameters splined on the drum shaft and adapted to be moved into or out of meshing relation, with the larger or the smaller gear wheels carried by the differential housing to impart variable speeds to the drum shaft, means for shifting the gears on the drum shaft, and a winding drum keyed to the drum shaft.

In testimony that I claim the foregoing as my own, I have hereto affixed my signature.

LEO HAUBERT.